United States Patent
Kim et al.

(10) Patent No.: US 11,938,813 B2
(45) Date of Patent: Mar. 26, 2024

(54) APPARATUS AND METHOD FOR CONTROLLING VEHICLE DISCONNECTOR DEVICE

(71) Applicant: Hyundai Transys Inc., Seosan-si (KR)

(72) Inventors: Youngkyu Kim, Hwaseong-si (KR); Yeonho Kim, Hwaseong-si (KR); Jong Bae Ahn, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/960,336

(22) Filed: Oct. 5, 2022

(65) Prior Publication Data

US 2023/0106277 A1    Apr. 6, 2023

(30) Foreign Application Priority Data

Oct. 6, 2021    (KR) .................. 10-2021-0132482

(51) Int. Cl.
*B60K 23/08*    (2006.01)
*B60K 17/346*    (2006.01)

(52) U.S. Cl.
CPC ............ *B60K 23/08* (2013.01); *B60K 17/346* (2013.01); *B60K 2023/0858* (2013.01)

(58) Field of Classification Search
CPC .................. B60K 23/08; B60K 17/346; B60K 2023/0858; B60K 17/02; B60Y 2400/405; B60Y 2400/421; B60Y 2400/422
See application file for complete search history.

(56) References Cited

U.S. PATENT DOCUMENTS

2020/0158187 A1*    5/2020    Kajikawa ................ F16D 23/06

FOREIGN PATENT DOCUMENTS

| CN | 212979874 U | * | 4/2021 | ............ B60K 17/02 |
| KR | 101724316 B1 | * | 4/2017 | |
| KR | 10-2021-0104191 A | | 8/2021 | |

* cited by examiner

*Primary Examiner* — Justin Holmes
(74) *Attorney, Agent, or Firm* — Bridgeway IP Law Group, PLLC; Jihun Kim (57) ABSTRACT

An apparatus for controlling a vehicle disconnector device according to an exemplary embodiment of the present invention includes a vehicle information acquisition unit configured to acquire vehicle information, a calculation unit configured to calculate an engagement length of a sleeve of the vehicle disconnector device based on the vehicle information, and a control unit configured to compare the engagement length of the sleeve with a preset reference engagement length and configured to determine whether to determine an engagement length of the sleeve, which is calculated based on the comparison result, as the engagement length.

20 Claims, 9 Drawing Sheets

APPARATUS AND METHOD FOR CONTROLLING VEHICLE DISCONNECTOR DEVICE

CROSS-REFERENCE TO RELATED APPLICATIONS

This application claims priority to and the benefit of Korean Patent Application No. 10-2021-0132482 filed in the Korean Intellectual Property Office on Oct. 6, 2021, the entire contents of which are incorporated herein by reference.

TECHNICAL FIELD

The present invention relates to an apparatus and method for controlling a vehicle disconnector device.

BACKGROUND ART

In general, a disconnector device is a device applied to an electric vehicle. Depending on traveling situations of the vehicle, the disconnector device switches a driving mode to fourwheel drive (4WD) by making power connection by meshing teeth of a sleeve and teeth of a differential shaft or switches the driving mode to two-wheel drive (2WD) by separating the teeth of the sleeve from the teeth of the differential shaft, thereby minimizing an unnecessary loss of power (drag torque) and improving fuel economy.

A vehicle controller unit (VCU) of the vehicle operates a motor of the disconnector device or a drive motor of a front wheel speed reducer connected to a differential assembly depending on a traveling state of the vehicle.

The motor of the disconnector device is connected to a ball screw. The motor of the disconnector device may fasten or unfasten the differential shaft by moving a fork and the sleeve connected to the ball screw that converts a rotational motion into a rectilinear motion. Therefore, the vehicle may travel in the four-wheel drive (4WD) mode or the two-wheel drive (2WD) mode.

That is, the disconnector device fastens a hub and the differential assembly by engaging the shaft and the sleeve. In this case, an engaging portion between the shaft and the sleeve is implemented as a dog clutch-shaped structure. In this case, the shaft and the sleeve are not fastened in a state in which the shaft and the sleeve are completely synchronized (relative velocity: 0). However, a fastening attempt is made to move the sleeve toward the shaft in a state in which a relative velocity is present at a predetermined level.

However, when an engagement length of the sleeve, which is defined when the teeth (gear teeth) of the sleeve enter the teeth (gear teeth) of the differential shaft, is small, the moment of inertia and the relative revolutions per minute (RPM) of the motor are transmitted to the sleeve and the differential shaft, which may cause abrasion of ends of the teeth of the sleeve and ends of the teeth of the differential shaft.

A reaction force is applied in an unfastening direction by the contact between the abrasion portions of the sleeve and the differential shaft. For this reason, there may occur a breakdown situation such as a delay of fastening between the sleeve and the differential shaft or impossibility of fastening.

Accordingly, there is a need to ensure a sufficient engagement length of the sleeve to prevent the breakdown situation or ensure fastening stability.

SUMMARY OF THE INVENTION

The present invention has been contrived in consideration of the above-mentioned situations, and an object of the present invention is to provide an apparatus and method for controlling a vehicle disconnector device, which is capable of preventing a delay of fastening or impossibility of fastening caused by abrasion by ensuring a sufficient engagement length of a sleeve by using an operation element based on specifications of the disconnector device and a differential assembly.

To achieve the above-mentioned object, an apparatus for controlling a vehicle disconnector device according to an exemplary embodiment of the present invention includes: a vehicle information acquisition unit configured to acquire vehicle information; a calculation unit configured to calculate an engagement length of a sleeve of the vehicle disconnector device based on the vehicle information; and a control unit configured to compare the engagement length of the sleeve with a preset reference engagement length and configured to determine whether to determine an engagement length of the sleeve, which is calculated based on the comparison result, as the engagement length.

The vehicle information may include constituent elements and operation elements of the vehicle disconnector device, the constituent elements may include a backlash between the sleeve and a shaft of a differential assembly, a pitch circle diameter (PCD) between the shaft and the sleeve, and a weight obtained by summing up weights of the sleeve and a fork of the disconnector device, and the operation elements may include a relative rotational speed between the shaft and the sleeve and an operating current in case of balking.

The calculation unit may calculate a backlash rotation angle by using the backlash and the PCD and convert the relative rotational speed into a rotation angle per second of the sleeve. The calculation unit may use the backlash rotation angle and the rotation angle per second and may calculate a movement time of the sleeve for which the sleeve moves.

The calculation unit may convert the operating current in case of balking into a sleeve shift force.

The calculation unit may calculate an acceleration of the sleeve by using the sleeve shift force and the weight obtained by summing up the weights of the sleeve and the fork of the disconnector device.

The calculation unit may calculate a movement speed of the sleeve by using the movement time of the sleeve, an initial speed of the sleeve, and the acceleration of the sleeve.

The calculation unit may calculate the engagement length of the sleeve by using the movement speed of the sleeve, the initial speed of the sleeve, and the acceleration of the sleeve.

When a difference between the engagement length of the sleeve and the reference engagement length is more than a predetermined value, the control unit may change the relative rotational speed of the sleeve and the operating current in case of balking and transmit the changed relative rotational speed of the sleeve and the changed operating current in case of balking to the calculation unit, and when the difference between the engagement length of the sleeve and the reference engagement length is equal to or less than the predetermined value, the control unit may determine the calculated engagement length of the sleeve as the engagement length.

The control unit may control a motor of the disconnector device by using the relative rotational speed of the sleeve and the operating current in case of balking that have been used to calculate the determined engagement length of the sleeve.

To achieve the above-mentioned object, a method of controlling a vehicle disconnector device according to another exemplary embodiment of the present invention includes: a vehicle information acquisition step of acquiring vehicle information by a vehicle information acquisition unit; a calculation step of calculating, by a calculation unit, an engagement length of a sleeve of the vehicle disconnector device based on the vehicle information; and a comparison step of comparing, by a control unit, the engagement length of the sleeve with a preset reference engagement length and determining whether to determine an engagement length of the sleeve, which is calculated based on the comparison result, as the engagement length.

The vehicle information may include constituent elements and operation elements of the vehicle disconnector device, the constituent elements may include a backlash between the sleeve and a shaft of a differential assembly, a pitch circle diameter (PCD) between the shaft and the sleeve, and a weight obtained by summing up weights of the sleeve and a fork of the disconnector device, and the operation elements may include a relative rotational speed between the shaft and the sleeve and an operating current in case of balking.

The calculation step may calculate a backlash rotation angle by using the backlash and the PCD and convert the relative rotational speed into a rotation angle per second of the sleeve.

The calculation step may use the backlash rotation angle and the rotation angle per second and may calculate a movement time of the sleeve for which the sleeve moves.

The calculation step may convert the operating current in case of balking into a sleeve shift force.

The calculation step may calculate an acceleration of the sleeve by using the sleeve shift force and the weight obtained by summing up the weights of the sleeve and the fork of the disconnector device.

The calculation step may calculate a movement speed of the sleeve by using the movement time of the sleeve, an initial speed of the sleeve, and the acceleration of the sleeve.

The calculation step may calculate the engagement length of the sleeve by using the movement speed of the sleeve, the initial speed of the sleeve, and the acceleration of the sleeve.

The method may further include: a change step of changing, by the control unit, the relative rotational speed of the sleeve and the operating current in case of balking and transmitting the changed relative rotational speed of the sleeve and the changed operating current in case of balking to the calculation unit when a difference between the engagement length of the sleeve and the reference engagement length is more than a predetermined value; and a determination step of determining, by the control unit, the calculated engagement length of the sleeve as the engagement length when the difference between the engagement length of the sleeve and the reference engagement length is equal to or less than the predetermined value.

The method may further include a control step of controlling, by the control unit, a motor of the disconnector device by using the relative rotational speed of the sleeve and the operating current in case of balking that have been used to calculate the determined engagement length of the sleeve.

According to the apparatus and method for controlling the vehicle disconnector device according to the exemplary embodiment of the present invention, it is possible to ensure a sufficient engagement length of the sleeve by using the constituent elements and the operation elements based on the specifications of the disconnector device and the differential assembly, thereby preventing a delay of fastening or impossibility of fastening caused by abrasion.

It is possible to ensure stability of fastening performance of the disconnector device.

It is possible to prevent a deterioration in vehicle performance caused by dissatisfaction with fastening performance of the disconnector device and prevent a potential loss of costs caused by the deterioration in vehicle performance.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. Further, the exemplary embodiments of the present invention will be described below, but the technical spirit of the present invention is not limited thereto and may of course be modified and variously carried out by those skilled in the art.

Figure 1:
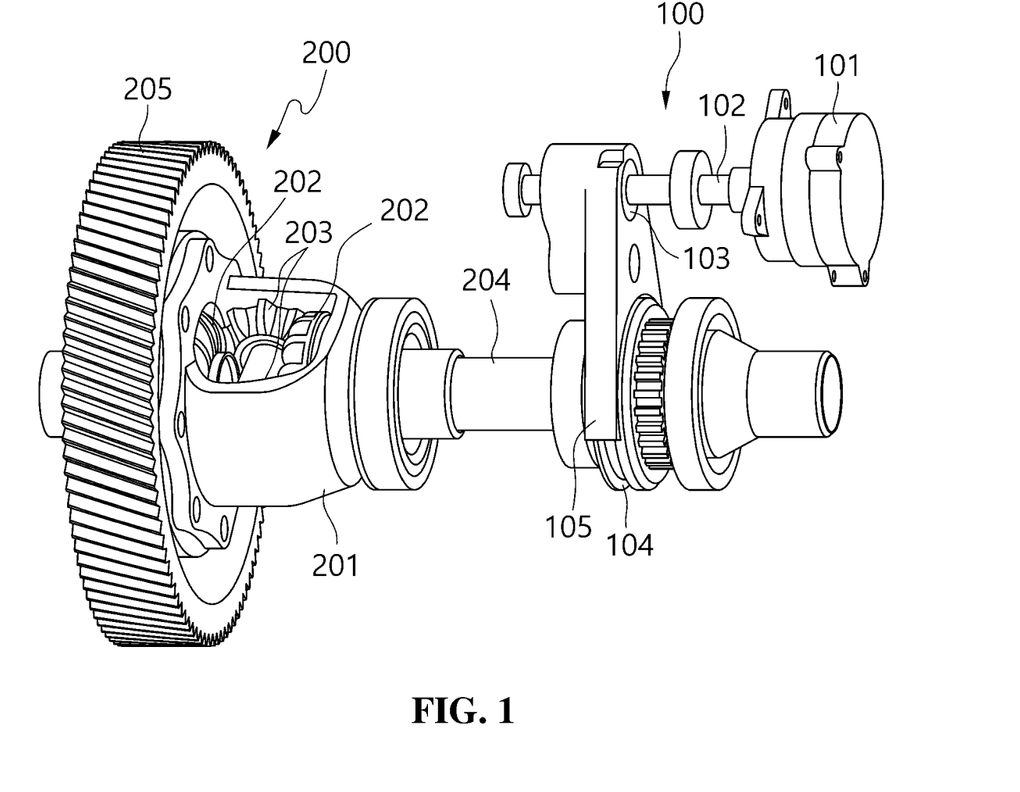
FIG. 1 is a view illustrating a disconnector device.

FIG. 1 is a view illustrating a disconnector device.

Figure 2:
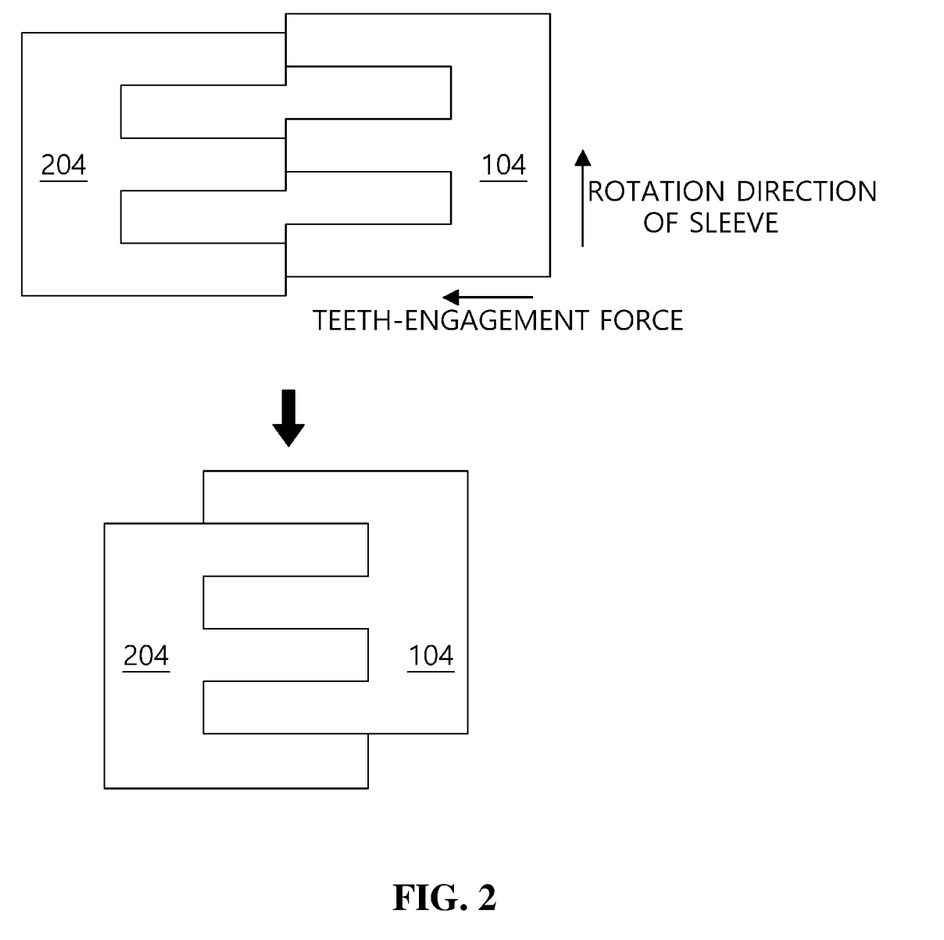
FIG. 2 is a view schematically illustrating a process of engaging a differential shaft and a sleeve of the disconnector device in FIG. 1.

FIG. 2 is a view schematically illustrating a process of engaging a differential shaft and a sleeve of the disconnector device.

Figure 3:
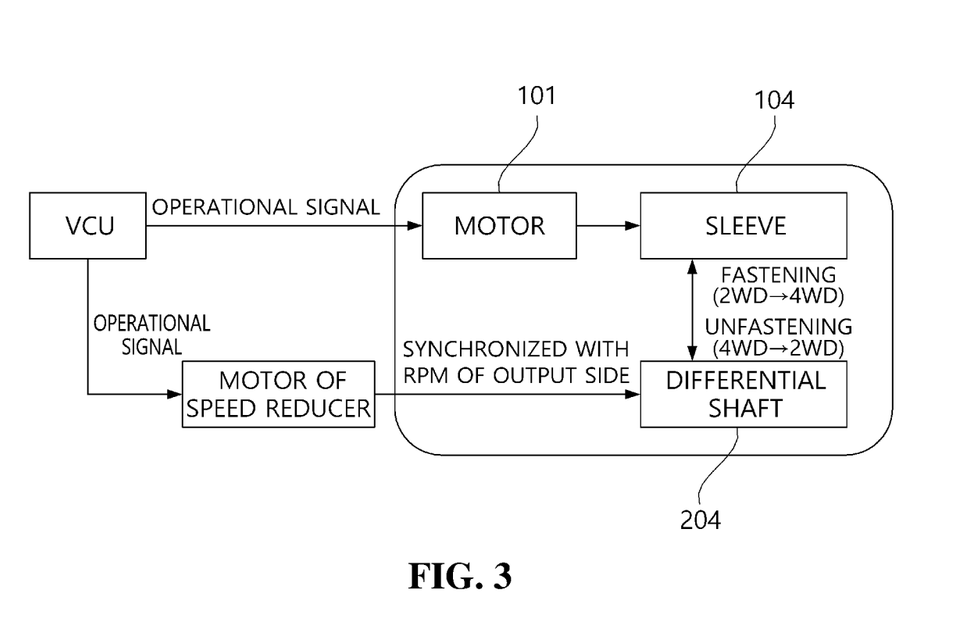
FIG. 3 is a view schematically illustrating an operation of the disconnector device in FIG. 1.

FIG. 3 is a view schematically illustrating an operation of the disconnector device.

Referring to FIGS. 1 to 3, a disconnector device 100 is connected to a differential assembly 200. A differential gear set is mounted in a differential casing 201 of a differential assembly 200. The differential gear set includes two side gears 202 and two pinion gears 203 configured to mesh with the two side gears 202.

The disconnector device 100 is connected to the differential assembly 200. The differential assembly 200 includes the differential casing 201, the two side gears 202 provided in the differential casing 201, and a differential shaft 204 connected to any one of the two side gears 202. The disconnector device 100 includes a motor 101 configured to generate power, a ball screw shaft 102 connected to the motor 101, and a fork 105 having one end having a nut 103 configured to be movable along the ball screw shaft 102, and the other end connected to a sleeve 104. The fork 105 may implement four-wheel drive (4WD) by allowing the sleeve 104 to engage with or connect to the differential shaft 204 by moving the sleeve 104 in a direction of the differential shaft 204. Alternatively, the fork 105 may implement two-wheel drive (2WD) by separating the sleeve 104 from the differential shaft 204 by moving the sleeve 104 in a direction opposite to the direction of the differential shaft 204.

Figure 4A:
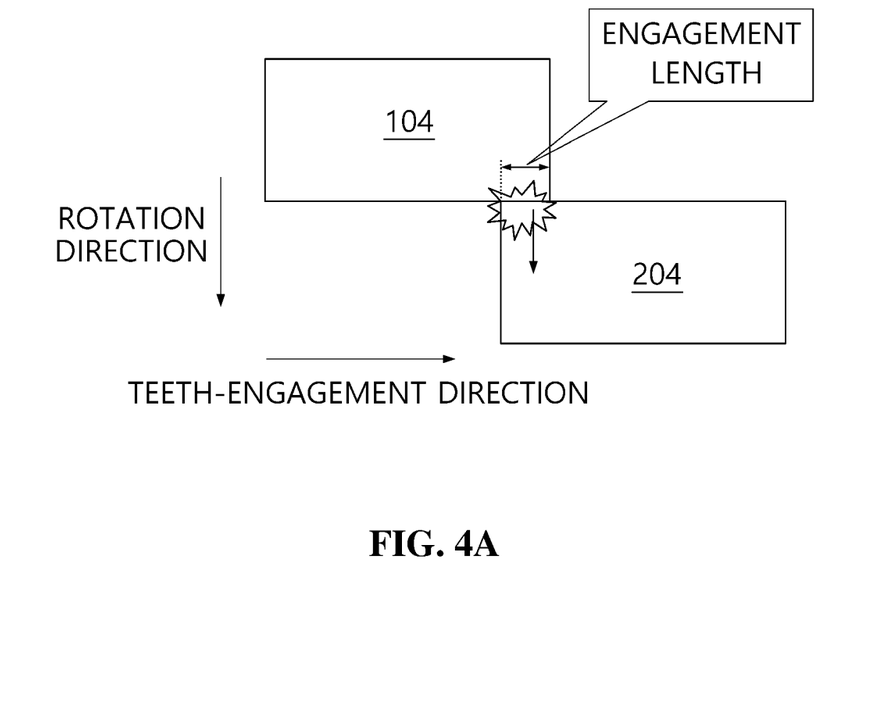
FIG. 4A and FIG. 4B are a view schematically illustrating the disconnector device in FIG. 1 in an impossible engagement state.
Figure 4B:
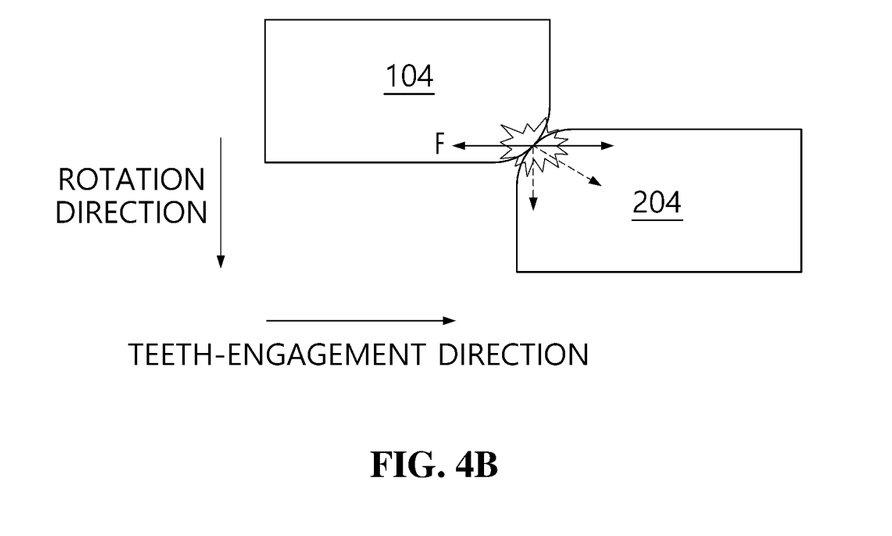

FIG. 4A and FIG. 4B are a view schematically illustrating the disconnector device in FIG. 1 in an impossible engagement state.

FIG. 4A illustrates an initial state in which teeth of the sleeve 104 enter teeth of the differential shaft 204. In this case, an appropriate engagement length of the sleeve 104 may be ensured, and no reaction force is generated in a disengagement direction.

FIG. 4B illustrates that abrasion occurs on a contact part between an end of the tooth of the sleeve 104 and an end of the tooth of the differential shaft 204 because the sleeve 104 moves toward the differential shaft 204 in a stationary state and a force of the sleeve 104 is applied to the differential shaft 204 in a state in which the end of the tooth of the sleeve 104 and the end of the tooth of the differential shaft 204 only come into contact with each other without meshing with each other.

At the same time, at the moment when the tooth of the sleeve 104 collides with the tooth of the differential shaft 204, the sleeve 104 may be bounced and pushed in a direction opposite to the direction of engagement by a reaction force F. This state is an impossible engagement state in which the tooth of the sleeve 104 and the tooth of the differential shaft 204 do not mesh with each other.

Figure 5:
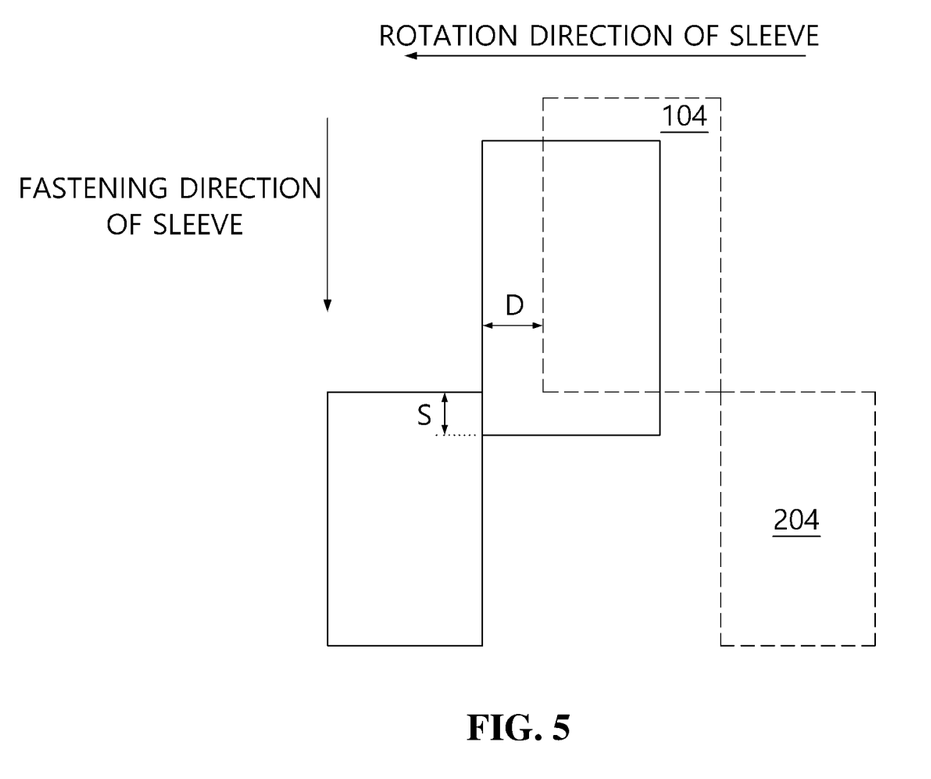
FIG. 5 is a view for explaining an engagement length of the sleeve according to an exemplary embodiment of the present invention.

FIG. 5 is a view for explaining an engagement length of the sleeve according to an exemplary embodiment of the present invention.

Referring to FIG. 5, it is possible to identify an engagement length S of the sleeve 104 for preventing the impossible engagement state when the tooth of the sleeve 104 and the tooth of the differential shaft 204 mesh with each other. The engagement length S of the sleeve 104 may be determined by various types of constituent elements and operation elements of the disconnector device 104. The constituent elements and the operation elements may be identified by separate testing processes.

The constituent elements, which have been identified by the testing process, may include a backlash D between the shaft 204 and the sleeve 104, a pitch circle diameter (PCD) between the shaft 204 and the sleeve 104, and a weight obtained by summing up weights of the fork 105 and the sleeve 104 of the disconnector device 100.

The operation elements, which have been identified by the testing process, may include a relative rotational speed between the shaft 204 and the sleeve 104 and an operating current in case of balking.

Table 1 shows one embodiment of various types of constituent elements and operation elements used to determine the engagement length S of the sleeve 104 derived from any test result.

TABLE 1

| Classification | Items | Unit | Value |
| --- | --- | --- | --- |
| Input | Backlash (D) between shaft and sleeve | mm | 0.243 |
| Input | Pitch circle diameter (PCD) between shaft and sleeve | mm | 64.22 |
| | Backlash rotation angle | ° | 0.433 |
| Input | Relative rotational speed between shaft and sleeve (attempt at engagement) | rpm | 10 |
| | Relative rotational speed → Rotation angle per second | °/s | 60 |
| | Time (t) taken for movement | s | 0.007 |
| Input | Operating current in case of balking (proportional to shift force) | A | 5 |
| | Sleeve shift force F | kgf | 29.082 |
| Input | Weight (m) <fork + sleeve> | kg | 0.687 |
| | Sleeve acceleration (a: F/m) | m/s$^2$ | 42.331 |
| | Sleeve movement speed in case of engagement (V: $V_0$ + at) | m/s | 0.305 |
| Output | Engagement length (S: $(V^2 - V_0^2)/2a$)) | m | 1.10 |

Referring to Table 1, the backlash D between the shaft 204 and the sleeve 104 may be a constituent element set in a machine design situation. The backlash D may be converted into a backlash angle by means of an input to a calculation unit 320 to be described below.

The PCD between the shaft 204 and the sleeve 104 may be a constituent element set in a machine design situation. The PCD may be used to calculate the backlash angle by means of an input to the calculation unit 320.

A relative rotational speed between the shaft 204 and the sleeve 104 according to the attempt at engagement may be an operation element that varies depending on electronic control. The relative rotational speed may be converted into a rotation angle per second by means of an input to the calculation unit 320.

The backlash angle and the rotation angle per second, which are calculated previously, may be used to calculate a sleeve movement time taken for the sleeve 104 to move a depth L of the shaft 204.

The operating current in case of balking may be an operation element that varies depending on electronic control. The operating current may be converted into a sleeve shift force by means of an input to the calculation unit 320, and the sleeve shift force may be outputted.

The weight obtained by summing up weights of the fork 105 and the sleeve 104 of the disconnector device 100 may be a constituent element set in a machine design situation.

The weight may be used to calculate a sleeve acceleration by means of an input to the calculation unit 320. That is, the previously calculated sleeve shift force F and the weight F obtained by summing up the weights of the fork 105 and the sleeve 104 may be used to calculate the sleeve acceleration.

The sleeve movement time and the sleeve acceleration, which are previously calculated, may be used to calculate a sleeve movement speed. In this case, an initial speed of the sleeve 104 may be excluded from the calculation of the sleeve movement speed because the sleeve 104 is in the state of butting on the shaft 204.

Finally, the sleeve acceleration and the sleeve movement speed may be used to calculate the engagement length of the sleeve 104.

That is, it is possible to determine the engagement length of the sleeve 104 by using the constituent elements including the backlash between the sleeve and the shaft of the differential assembly, the pitch circle diameter (PCD) between the shaft and the sleeve, and the weight obtained by summing up the weights of the fork and the sleeve of the disconnector device, and by using the operation elements including the relative rotational speed between the shaft and the sleeve and the operating current in case of balking.

The constituent elements and the operation elements may be used to determine the engagement length of the sleeve 104 according to the exemplary embodiment of the present invention.

A method of calculating the engagement length S of the sleeve 104 according to the exemplary embodiment of the present invention and a method of controlling the disconnector device using the above-mentioned method will be described below with reference to FIGS. 7 and 8.

FIG. 6A to FIG. 6E are a view illustrating the constituent element and the operation element used to determine the engagement length of the sleeve according to the exemplary embodiment of the present invention.

Referring to FIG. 6A to FIG. 6E, it is possible to identify a graph showing a relationship between the engagement length of the sleeve 104 and various types of operation elements.

Figure 6A:
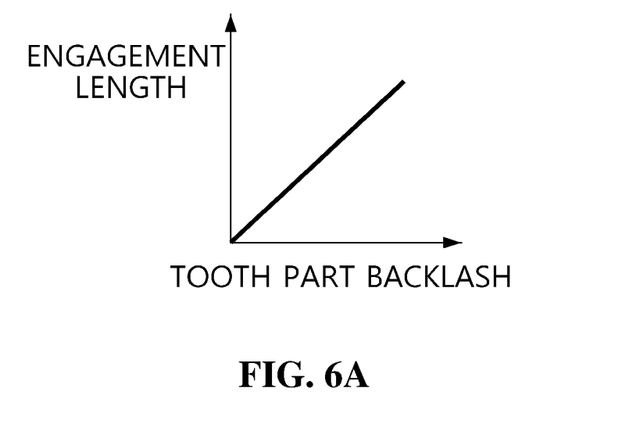
FIG. 6A to FIG. 6E are a view illustrating a constituent element and an operation element used to control the engagement length of the sleeve according to the exemplary embodiment of the present invention.

FIG. 6A is a graph showing a relationship between the engagement length of the sleeve 104 and a tooth part backlash (a backlash between the sleeve 104 and the shaft 204). The tooth part backlash is proportional to the engagement length of the sleeve 104.

Figure 6B:
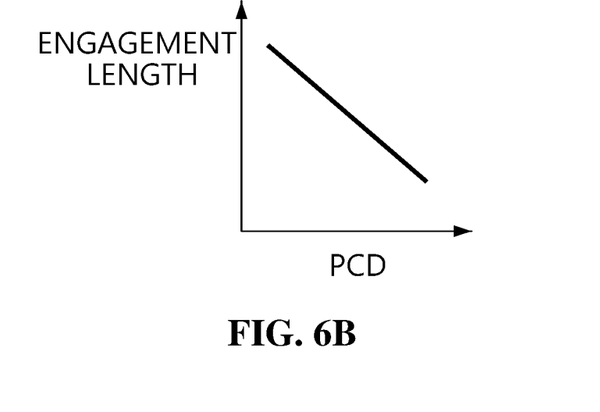

FIG. 6B is a graph showing a relationship between the engagement length of the sleeve 104 and the PCD between the sleeve 104 and the shaft 204. The PCD between the sleeve 104 and the shaft 204 is inversely proportional to the engagement length of the sleeve 104.

Figure 6C:
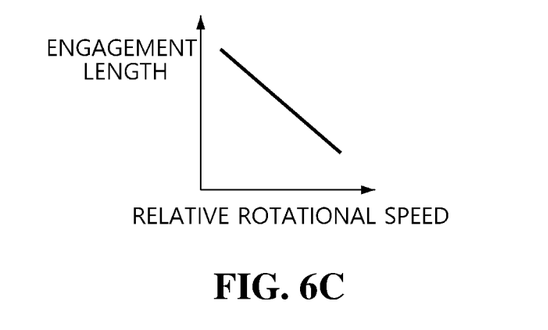

FIG. 6C is a graph showing a relationship between the engagement length of the sleeve 104 and relative rpm (relative rotational speed) in case of the attempt at engagement. The relative rpm (relative rotational speed) in case of the attempt at engagement is inversely proportional to the engagement length of the sleeve 104.

Figure 6D:
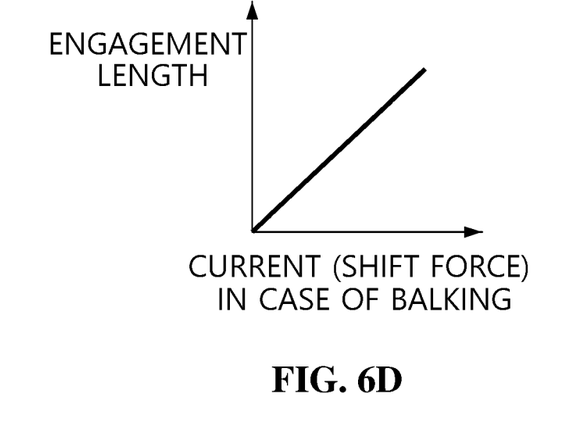

FIG. 6D is a graph illustrating a relationship between the engagement length of the sleeve 104 and a current (shift force) in case of balking. The current (shift force) in case of balking is proportional to the engagement length of the sleeve 104.

Figure 6E:
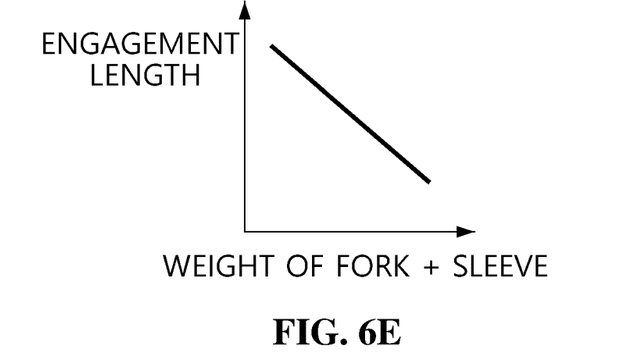

FIG. 6E is a graph showing a relationship between the engagement length of the sleeve 104 and the weight obtained by summing up the weights of the fork 105 and the sleeve 104. The weight obtained by summing up the weights of the fork 105 and the sleeve 104 is inversely proportional to the engagement length of the sleeve 104.

The apparatus and method for controlling the vehicle disconnector device according to the exemplary embodiment of the present invention may determine the engagement length of the sleeve 104 by considering the constituent elements and the operation elements, compare the engagement length with a preset optimal reference engagement length according to the vehicle specifications, change the operation elements depending on whether the engagement length coincides with the preset optimal reference engagement length, and control the motor 101 of the disconnector device, thereby preventing a situation in which the sleeve 104 and the shaft 204 cannot engage with each other.

Figure 7:
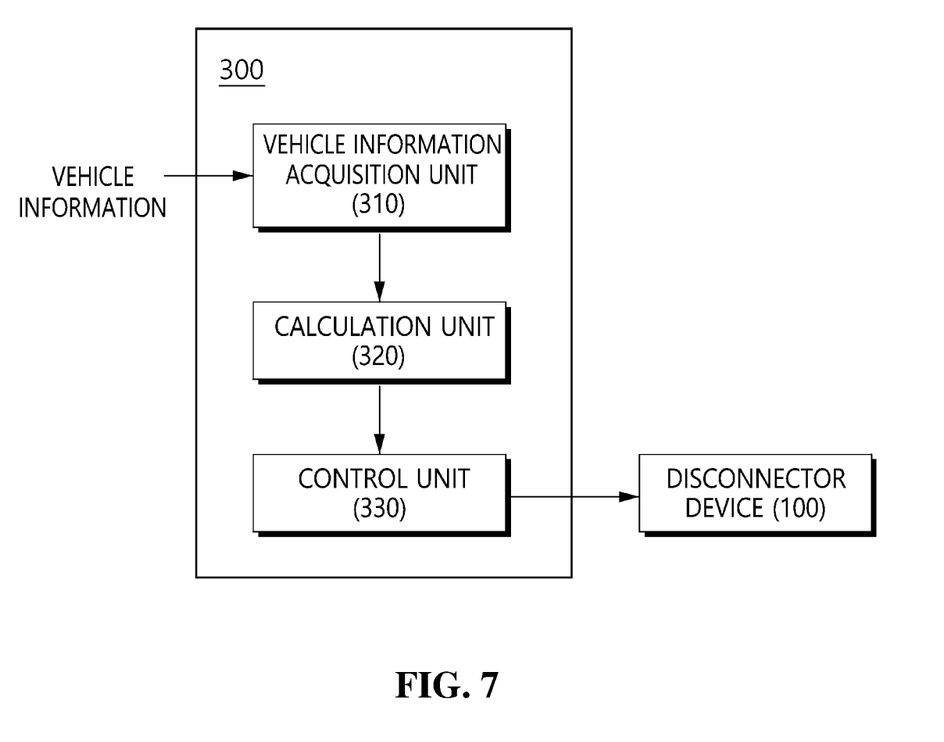
FIG. 7 is a block diagram of an apparatus for controlling the vehicle disconnector device according to the exemplary embodiment of the present invention.

FIG. 7 is a block diagram of the apparatus for controlling the vehicle disconnector device according to the exemplary embodiment of the present invention.

Referring to FIG. 7, an apparatus 300 for controlling the vehicle disconnector device according to an exemplary embodiment of the present invention may calculate the engagement length of the sleeve 104 by using various types of constituent elements and operation elements of the vehicle, compare the calculated engagement length of the sleeve 104 with the preset reference engagement length, change the operation elements depending on whether the calculated engagement length coincides with the preset reference engagement length, and control the motor of the disconnector device, thereby preventing the impossible engagement situation of the sleeve 104 and the shaft 204 caused because the engagement length of the sleeve 104 is not ensured at the time of controlling the disconnector device 100.

The apparatus 300 for controlling the vehicle disconnector device according to the exemplary embodiment of the present invention may include a vehicle information acquisition unit 310, a calculation unit 320, and a control unit 330.

The vehicle information acquisition unit 310 may acquire vehicle information through various types of sensor devices or memory devices in the vehicle. The vehicle information acquisition unit 310 may acquire various types of constituent elements and various types of operation elements of the disconnector device 100 as vehicle information. In this case, the constituent elements may include the backlash D between the shaft 204 and the sleeve 104, the pitch circle diameter (PCD) between the shaft 204 and the sleeve 104, and the weight obtained by summing up the weights of the fork 105 and the sleeve 104.

The operation elements may include the relative rotational speed between the shaft 204 and the sleeve 104 and the operating current in case of balking.

The calculation unit 320 may receive information on various types of constituent elements and operation elements from the vehicle information acquisition unit 310. The calculation unit 320 may calculate the engagement length of the sleeve 104 by using the received various types of constituent elements and operation elements.

First, the calculation unit 320 may calculate the movement time t of the sleeve 104 according to the operation of fastening the sleeve 104 and the shaft 204. In this case, the backlash D between the shaft 204 and the sleeve 104, the PCD between the shaft 204 and the sleeve 104, and the relative rotational speed between the shaft 204 and the sleeve 104 may be used to calculate the movement time t of the sleeve 104.

To this end, the calculation unit 320 may convert the backlash D between the shaft 204 and the sleeve 104 into the backlash rotation angle. The PCD between the shaft 204 and the sleeve 104 may be further considered to convert the backlash into the backlash rotation angle.

The calculation unit 320 may convert the relative rotational speed between the shaft 204 and the sleeve 104 into revolutions per second (RPS). Thereafter, the calculation unit 320 may convert the revolutions per second into a rotation angle per second.

The calculation unit 320 may use the backlash angle and the rotation angle per second, which are calculated previously, to calculate the movement time t of the sleeve 104 for which the sleeve 104 moves. The movement time t may be a time for which the sleeve 104 enters the shaft 204 by a predetermined depth L.

The calculation unit 320 may convert the operating current in case of balking into the sleeve shift force.

The calculation unit 320 may calculate the sleeve acceleration by using the sleeve shift force.

The calculation unit 320 may calculate the sleeve movement speed by using the sleeve initial speed, the sleeve acceleration, and the sleeve movement time. In this case, the sleeve initial speed may be 0 in accordance with a butting state.

The calculation unit 320 may use the sleeve movement speed and the sleeve acceleration and calculate the engagement length of the sleeve 104 that indicates a distance that the sleeve moves for the movement time.

The method of calculating the engagement length S of the sleeve 104 may be expressed as Equations 1 to 5 below.

$$V^2 - V_0^2 = 2aS \qquad \text{<Equation 1>}$$

In Equation 1, V represents the movement speed of the sleeve 104, $V_0$ represents the initial speed of the sleeve 104, a represents the acceleration of the sleeve 104, and S represents the engagement length (movement distance) of the sleeve 104.

Equation 1 may be expressed as Equation 2 in accordance with an equivalent velocity calculation formula.

$$S = (V^2 - V_0^2)/2a \qquad \text{<Equation 2>}$$

In Equations 1 and 2, the initial speed $V_0$ of the sleeve 104 is 0 in a butting state.

In Equations 1 and 2, the acceleration a of the sleeve 104 may be expressed by Equations 3 and 4 below.

$$F = ma \qquad \text{<Equation 3>}$$

$$a = F/m \qquad \text{<Equation 4>}$$

In Equations 3 and 4, F represents the shift force (shift power) of the sleeve 104, and m represents the weight obtained by summing up the weights of the sleeve 104 and the fork 105.

In Equations 1 and 2, a movement speed V of the sleeve 104 may be expressed by Equation 5.

$$V = V_0 + at \qquad \text{<Equation 5>}$$

In Equation 5, the movement speed V of the sleeve 104 may be calculated by adding a value, which is obtained by multiplying the acceleration a of the sleeve 104 by the movement time t of the sleeve 104, to the initial speed of the sleeve 104.

In Equations 1 and 2, the engagement length S of the sleeve 104 may be calculated by using the initial speed of the sleeve 104, the acceleration of the sleeve 104, and the movement speed of the sleeve 104 that are calculated by Equations 3 to 5.

The control unit 330 may receive the engagement length of the sleeve 104 from the calculation unit 320. The control unit 330 may compare the engagement length of the sleeve 104 with the preset reference engagement length. The reference engagement length may be an optimal engagement length set based on the vehicle specifications.

When a difference between the calculated engagement length of the sleeve 104 and the reference engagement length is equal to or less than a predetermined value, the control unit 330 may finally determine the calculated engagement length as the engagement length of the sleeve 104. The predetermined value may be appropriately set as required by the user.

When the difference between the calculated engagement length of the sleeve 104 and the reference engagement length is more than the predetermined value, the control unit 330 may determine that the operation element used to calculate the engagement length of the sleeve 104 needs to be changed. In this case, the calculation unit 320 may change the operation element in consideration of the difference between the calculated engagement length of the sleeve 104 and the reference engagement length. The calculation unit 320 may newly transmit the engagement length of the sleeve 104, which is calculated based on the changed operation element, to the control unit 330.

The control unit 330 may compare again the newly received engagement length of the sleeve 104 with the reference engagement length and determine the engagement length of the sleeve 104.

When the engagement length of the sleeve 104 is finally determined, the control unit 330 may control the motor 101 of the disconnector device 100 by adjusting the operation element that has been used to calculate the finally determined engagement length of the sleeve 104. That is, the control unit 330 may control the motor 101 by changing the relative rotational speed between the shaft and the sleeve and the operating current in case of balking.

Therefore, the sleeve 104 of the disconnector device 100 may move by the reference engagement length toward the shaft 204, such that the sleeve 104 may be fastened to the shaft 204. The control unit 330 may prevent the impossible engagement situation of the sleeve 104 and the shaft 204 by appropriately changing the engagement length of the sleeve 104 by adjusting the operation elements.

Figure 8:
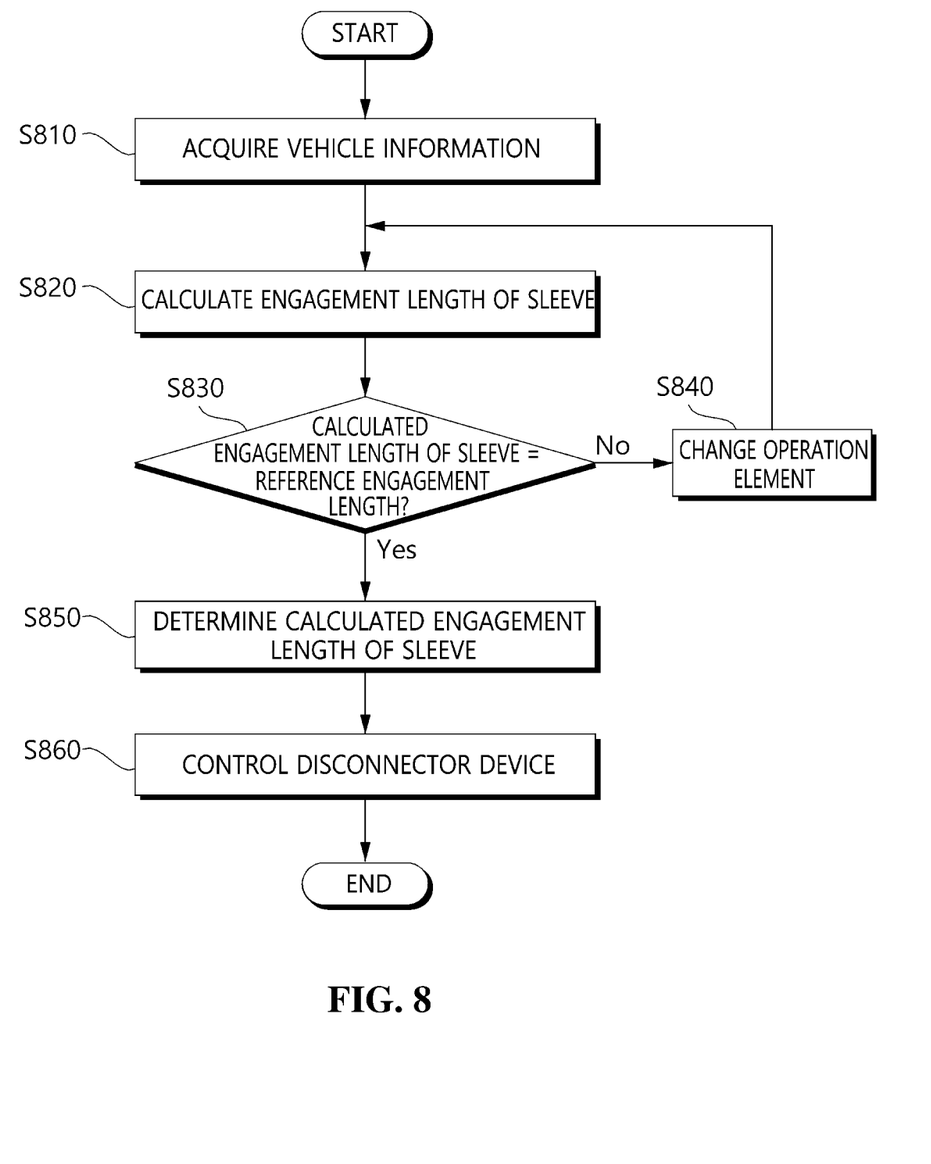
FIG. 8 is a flowchart of a method of controlling the vehicle disconnector device according to the exemplary embodiment of the present invention.

FIG. 8 is a flowchart of a method of controlling the vehicle disconnector device according to the exemplary embodiment of the present invention.

Referring to FIGS. 7 and 8, a method 300 of controlling the vehicle disconnector device according to an exemplary embodiment of the present invention may calculate the engagement length of the sleeve 104 by using various types of constituent elements and operation elements of the vehicle, compare the calculated engagement length of the sleeve 104 with the preset reference engagement length, change the operation elements depending on whether the calculated engagement length coincides with the preset reference engagement length, and control the motor of the disconnector device, thereby preventing the impossible engagement situation of the sleeve 104 and the shaft 204 caused because the engagement length of the sleeve 104 is not ensured at the time of controlling the disconnector device 100.

The method of controlling the vehicle disconnector device according to the exemplary embodiment of the present invention may include a vehicle information acquisition step (S810), a calculation step (S820), a comparison step (S830), a change step (S840), a determination step (S850), and a control step (S860).

In the vehicle information acquisition step (S810), the vehicle information acquisition unit 310 may acquire vehicle information through various types of sensor devices or communication devices in the vehicle. The vehicle information acquisition unit 310 may acquire various types of constituent elements and operation elements of the disconnector device 100 as vehicle information. In this case, the constituent elements may include the backlash D between the shaft 204 and the sleeve 104, the pitch circle diameter (PCD) between the shaft 204 and the sleeve 104, and the weight obtained by summing up the weights of the fork 105 and the sleeve 104. The operation elements may include the relative rotational speed between the shaft 204 and the sleeve 104 and the operating current in case of balking.

In the calculation step (S820), the calculation unit 320 may receive information on the various types of constituent elements and operation elements from the vehicle information acquisition unit 310. The calculation unit 320 may calculate the engagement length of the sleeve 104 by using the received various types of constituent elements and operation elements.

First, the calculation unit 320 may calculate the movement time of the sleeve by using the backlash, the PCD, and the relative rotational speed.

The calculation unit 320 may calculate the backlash rotation angle by using the backlash and the PCD.

The calculation unit 320 may convert the relative rotational speed into the rotation angle per second of the sleeve.

The calculation unit 320 may use the backlash rotation angle and the rotation angle per second and calculate the movement time of the sleeve for which the sleeve moves.

The calculation unit 320 may convert the operating current in case of balking into the sleeve shift force.

The calculation unit 320 may calculate the acceleration of the sleeve by using the weight obtained by summing up the weights of the fork 105 and the sleeve 104 of the disconnector device and the sleeve shift force.

The calculation unit 320 may calculate the movement speed of the sleeve by using the movement time of the sleeve, the initial speed of the sleeve, and the acceleration of the sleeve.

The calculation unit 320 may calculate the engagement length of the sleeve by using the movement speed of the sleeve, the initial speed of the sleeve, and the acceleration of the sleeve.

In comparison step (S830), the control unit 330 may receive the engagement length of the sleeve 104 from the calculation unit 320. The control unit 330 may compare the calculated engagement length of the sleeve 104 with the preset reference engagement length.

In the change step (S840), when the difference between the calculated engagement length of the sleeve 104 and the reference engagement length is more than the predetermined value, the control unit 330 may change the relative rotational speed of the sleeve and the operating current in case of balking and transmit the changed relative rotational speed and the changed operating current to the calculation unit 320. In this case, when the calculation unit 320 receives the changed relative rotational speed of the sleeve and the changed operating current in case of balking, the calculation unit 320 may calculate again the engagement length of the sleeve 104 based on the changed relative rotational speed and the changed operating current.

In the determination step (S850), when the difference between the engagement length of the sleeve 104 and the reference engagement length is equal to or less than the predetermined value, the control unit 330 may finally determine the calculated engagement length as the engagement length of the sleeve 104.

In the control step (S860), the control unit 330 may control the motor 101 of the disconnector device 100 by using the relative rotational speed and the operating current in case of balking that have been used to calculate the finally determined engagement length of the sleeve 104. Therefore, the sleeve 104 of the disconnector device 100 may move by the engagement length calculated by the calculation unit 320 toward the shaft 204, such that the sleeve 104 may be fastened to the shaft 204. The control unit 330 may prevent the impossible engagement situation of the sleeve 104 and the shaft 204 by appropriately changing the engagement length of the sleeve 104 by adjusting the operation elements.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings.

The steps and/or the operations according to the present invention may be simultaneously incurred in other exemplary embodiments in another order, in parallel, or for another epoch, which will be understood by those skilled in the art.

Depending on an exemplary embodiment, a part or all of the steps and/or the operations may be implemented or performed by using one or more processors driving a command stored in one or more non-temporary computer-readable media, a program, an interactive data structure, a client, and/or a server. An example of the one or more non-temporary computer-readable media may be software, firmware, hardware, and/or any combination thereof. Further, a function of "module" discussed in the present specification may be implemented by software, firmware, hardware, and/or any combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling a vehicle disconnector device, the apparatus comprising:
 a vehicle information acquisition unit configured to acquire vehicle information;

a calculation unit configured to calculate an engagement length of a sleeve of the vehicle disconnector device based on the vehicle information; and a control unit configured to compare the calculated engagement length of the sleeve with a preset reference engagement length and determine, based on a result of the comparison, whether to determine the calculated engagement length of the sleeve as an actual engagement length of the sleeve.

2. The apparatus of claim 1, wherein the vehicle information comprises constituent elements and operation elements of the vehicle disconnector device, wherein the constituent elements comprise a backlash between the sleeve and a shaft of a differential assembly, a pitch circle diameter (PCD) between the shaft and the sleeve, and a weight obtained by summing up weights of the sleeve and a fork of the disconnector device, and wherein the operation elements comprise a relative rotational speed between the shaft and the sleeve and an operating current in case of balking.

3. The apparatus of claim 2, wherein the calculation unit calculates a backlash rotation angle by using the backlash and the PCD and converts the relative rotational speed into a rotation angle per second of the sleeve.

4. The apparatus of claim 3, wherein the calculation unit uses the backlash rotation angle and the rotation angle per second and calculates a movement time of the sleeve for which the sleeve moves.

5. The apparatus of claim 4, wherein the calculation unit converts the operating current in case of balking into a sleeve shift force.

6. The apparatus of claim 5, wherein the calculation unit calculates an acceleration of the sleeve by using the sleeve shift force and the weight obtained by summing up the weights of the sleeve and the fork of the disconnector device.

7. The apparatus of claim 6, wherein the calculation unit calculates a movement speed of the sleeve by using the movement time of the sleeve, an initial speed of the sleeve, and the acceleration of the sleeve.

8. The apparatus of claim 7, wherein the calculation unit calculates the engagement length of the sleeve by using the movement speed of the sleeve, the initial speed of the sleeve, and the acceleration of the sleeve.

9. The apparatus of claim 8, wherein when a difference between the calculated engagement length of the sleeve and the reference engagement length is more than a predetermined value, the control unit changes the relative rotational speed of the sleeve and the operating current in case of balking and transmits the changed relative rotational speed of the sleeve and the changed operating current in case of balking to the calculation unit, and wherein when the difference between the calculated engagement length of the sleeve and the reference engagement length is equal to or less than the predetermined value, the control unit determines the calculated engagement length of the sleeve as the actual engagement length of the sleeve.

10. The apparatus of claim 2, wherein the control unit controls a motor of the disconnector device by using the relative rotational speed of the sleeve and the operating current in case of balking that have been used to calculate the engagement length of the sleeve.

11. A method of controlling a vehicle disconnector device, the method comprising:

acquiring vehicle information by a vehicle information acquisition unit;

calculating, by a calculation unit, an engagement length of a sleeve of the vehicle disconnector device based on the vehicle information; and comparing, by a control unit, the calculated engagement length of the sleeve with a preset reference engagement length and determining, based on a result of the comparison, whether to determine the calculated engagement length of the sleeve as an actual engagement length of the sleeve.

12. The method of claim 11, wherein the vehicle information comprises constituent elements and operation elements of the vehicle disconnector device, wherein the constituent elements comprise a backlash between the sleeve and a shaft of a differential assembly, a pitch circle diameter (PCD) between the shaft and the sleeve, and a weight obtained by summing up weights of the sleeve and a fork of the disconnector device, and wherein the operation elements comprise a relative rotational speed between the shaft and the sleeve and an operating current in case of balking.

13. The method of claim 12, wherein calculating the engagement length of the sleeve includes calculating a backlash rotation angle by using the backlash and the PCD and converting the relative rotational speed into a rotation angle per second of the sleeve.

14. The method of claim 13, wherein calculating the engagement length of the sleeve includes calculating a movement time of the sleeve for which the sleeve moves by using the backlash rotation angle and the rotation angle per second.

15. The method of claim 14, wherein calculating the engagement length of the sleeve includes converting the operating current in case of balking into a sleeve shift force.

16. The method of claim 15, wherein calculating the engagement length of the sleeve includes calculating an acceleration of the sleeve by using the sleeve shift force and the weight obtained by summing up the weights of the sleeve and the fork of the disconnector device.

17. The method of claim 16, wherein calculating the engagement length of the sleeve includes calculating a movement speed of the sleeve by using the movement time of the sleeve, an initial speed of the sleeve, and the acceleration of the sleeve.

18. The method of claim 17, wherein calculating the engagement length of the sleeve includes calculating the engagement length of the sleeve by using the movement speed of the sleeve, the initial speed of the sleeve, and the acceleration of the sleeve.

19. The method of claim 18, further comprising:

changing, by the control unit, the relative rotational speed of the sleeve and the operating current in case of balking and transmitting the changed relative rotational speed of the sleeve and the changed operating current in case of balking to the calculation unit when a difference between the calculated engagement length of the sleeve and the reference engagement length is more than a predetermined value; and determining, by the control unit, the calculated engagement length of the sleeve as the actual engagement length of the sleeve when the difference between the calculated engagement length of the sleeve and the reference engagement length is equal to or less than the predetermined value.

20. The method of claim 12, further comprising:
controlling, by the control unit, a motor of the disconnector device by using the relative rotational speed of the sleeve and the operating current in case of balking that have been used to calculate the engagement length of the sleeve.

\* \* \* \* \*